(12) United States Patent
Schroeder

(10) Patent No.: US 8,545,699 B2
(45) Date of Patent: Oct. 1, 2013

(54) FILTER ASSEMBLY FOR FRYING OIL OR OTHER LIQUIDS AND AN ASSOCIATED VALVE ASSEMBLY

(75) Inventor: Kurt Schroeder, Charlotte, NC (US)

(73) Assignee: Schroeder, Inc., Charlotte, NC (US)

( * ) Notice: Subject to any disclaimer, the term of this patent is extended or adjusted under 35 U.S.C. 154(b) by 215 days.

(21) Appl. No.: 13/022,792

(22) Filed: Feb. 8, 2011

(65) Prior Publication Data

US 2011/0126925 A1 Jun. 2, 2011

Related U.S. Application Data

(62) Division of application No. 12/467,842, filed on May 18, 2009, now Pat. No. 7,931,804.

(60) Provisional application No. 61/054,181, filed on May 19, 2008.

(51) Int. Cl.
| | |
|---|---|
| B01D 35/157 | (2006.01) |
| A47J 37/12 | (2006.01) |
| B01D 35/00 | (2006.01) |
| A47J 37/00 | (2006.01) |
| F16K 51/00 | (2006.01) |

(52) U.S. Cl.
USPC . 210/341; 210/424; 210/DIG. 8; 210/167.28; 137/544; 137/550

(58) Field of Classification Search
USPC ....... 210/341, 424, DIG. 8, 167.28; 137/544, 137/550
See application file for complete search history.

(56) References Cited

U.S. PATENT DOCUMENTS

| | | | |
|---|---|---|---|
| 3,900,580 A | 8/1975 | Boggs | |
| 4,028,958 A * | 6/1977 | Schuermann et al. | ... 74/471 XY |
| 4,043,916 A | 8/1977 | Wecker, Sr. | |
| 4,081,375 A | 3/1978 | Deal et al. | |
| 4,115,276 A * | 9/1978 | Kelly | ............................ 210/425 |
| 4,522,436 A | 6/1985 | Hoen et al. | |
| 5,296,137 A * | 3/1994 | Gershon et al. | ............... 210/253 |
| 5,560,950 A | 10/1996 | Conte et al. | |
| 5,573,667 A | 11/1996 | Benesi | |
| 5,617,777 A * | 4/1997 | Davis et al. | ..................... 99/408 |

(Continued)

OTHER PUBLICATIONS

Photo from Filter Product Animations of Oberline Slip Stream Disposable Media Filtration; www.oberlinfilter.com (website visited May 16, 2008).

(Continued)

Primary Examiner — Nam Nguyen
Assistant Examiner — Madeline Gonzalez
(74) Attorney, Agent, or Firm — Alston & Bird LLP

(57) ABSTRACT

A filter assembly is provided. Embodiments of the filter assembly allow for the continuous filtering of the frying oil, while the fryer is on-line. The filter assembly may include a dirty chamber, a clean chamber, a pump configured to suck the frying oil through the chambers, and a toggle clamp configured to move the filter assembly between a closed configuration and an opened configuration. In the closed configuration, the filter assembly is configured to seal a filter media portion between the two chambers. The pump is configured to suck oil into the dirty chamber and through the filter media and into the clean chamber in order to filter dirt from the oil. In the opened configuration, the filter assembly is configured to allow the removal of now dirty filter media portion from between the chambers and the insertion of a new clean filter media portion.

20 Claims, 10 Drawing Sheets

(56) References Cited

U.S. PATENT DOCUMENTS

| | | |
|---|---|---|
| 6,495,366 B1 | 12/2002 | Briggs |
| 6,672,336 B2 | 1/2004 | Nichols |
| 6,786,205 B2 | 9/2004 | Stuhldreher et al. |
| 7,566,468 B1 | 7/2009 | Oberlin et al. |
| 2002/0164821 A1 | 11/2002 | Brink et al. |
| 2003/0010140 A1 | 1/2003 | Kopl et al. |
| 2005/0072309 A1 | 4/2005 | Mullaney, Jr. |
| 2005/0232821 A1 | 10/2005 | Carrillo et al. |
| 2008/0121578 A1 | 5/2008 | Burkett et al. |

OTHER PUBLICATIONS

Brochure on Oberlin Filter; How the Filter Works; downloaded from the following website: http://www.oberlinfilter.com/index.cfm?node=howitworks; Jul. 28, 2010; 6 sheets.

Brochure on Automatic Fluid Filtration Systems; downloaded from the following website: http://www.harrigansolutions.com/pdf/AFT-3_Bro.pdf; Jul. 28, 2010; 2 sheets.

\* cited by examiner

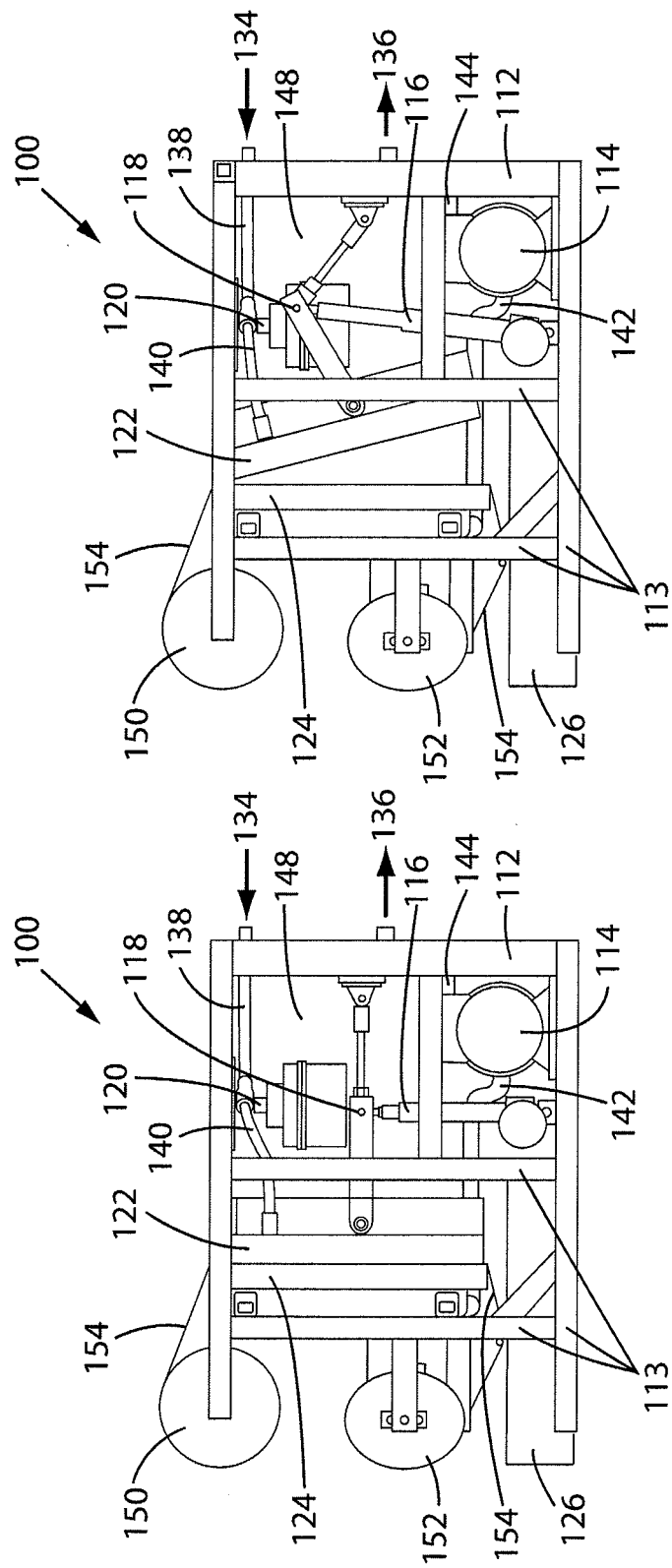

FILTER ASSEMBLY FOR FRYING OIL OR OTHER LIQUIDS AND AN ASSOCIATED VALVE ASSEMBLY

CROSS-REFERENCE TO RELATED APPLICATIONS

This application is a divisional of U.S. application Ser. No. 12/467,842, filed on May 18, 2009 now U.S. Pat. No. ,7,931, 804, which claims the benefit of U.S. Provisional Application No. 61/054,181, filed on May 19, 2008, each of which is incorporated by reference herein in its entirety.

BACKGROUND

1. Field of the Invention

The present invention relates to filter assemblies for filtering a liquid, such as frying oil, and associated valve assemblies for connecting the filter assemblies with the sources of the liquid.

2. Description of Related Art

Many food products served in retail restaurants are fried in cooking oil or shortening either at atmospheric or elevated pressures. Many of such food products, such as chicken, seafood or vegetables are breaded before being placed in hot oil for frying. The breading is usually a granular wheat product loosely bound to the food by moisture and egg albumin so a variety of particles thereof of different sizes tend to become unattached during the frying process. At first these pieces float, but after substantial moisture is cooked out of them, they sink, falling to the bottom of the fry pot of the fryer where they burn to discolor and impart a burnt taste to the oil. The burnt particles encourage an early breakdown of the cooking oil. The burning occurs even when the fry pot is designed to have a cool sump because the action of frying causes turbulence that keeps the oil at near the same temperature throughout the fry pot. For this reason many commercial food fryers are equipped with an oil filter, which is used to remove the breading particles from the oil after a certain number of frying cycles. Typically this type of filter requires the fryer to be off-line while filtering. The fryer is usually emptied into a lower chamber where the filter is located. Food can not be cooked during this process. The actual number of cycles may depend on the type and characteristics of the breaded food being fried. For example, the filtering of the cooking oil may be accomplished every three to six frying cycles.

Although some filter systems require that the oil be cooled to almost room temperature because of the filtering agents used, filtering is generally performed with the oil at or near normal frying temperatures. Typical oil filtering systems include a drain valve attached to the lower surface of the fry pot. A filter pan is placed underneath the drain valve and the valve is opened. The hot oil then pours into the filter pan with the operator taking care to avoid splashing that can result in severe burns. Even when the operator is careful, splashing can occur, so it may be preferred that the operator take the time to dress in protective clothing prior to the commencement of the filtering process. Such protective clothing commonly includes oil and heat resistant gloves, an oil and heat resistant apron, oil and heat resistant boots, and safety glasses.

Once the oil starts to drain, various scrappers and brushes are used to clean the sides of the fry pot and the electric heating element or gas flame tubes. When all of the cooking oil is drained and the fry pot is partially clean, the drain valve is closed and the hot oil is pumped back into fry pot until it is about ⅓ full. This clean oil is then used to thoroughly wash the sides of the fry pot, after which the oil is again drained and passed through the filter to remove any particles that might have been dislodged during the cleaning operation. The clean oil is then pumped back into the fry pot. After multiple filterings, the number of which are dependent upon the filter and the product accumulating therein, the filter media must be changed. Generally this is done after the oil has been pumped back into the fry pot and the filter has had an opportunity to cool. The whole filtering operation even in a highly automated food fryer can take as much as half an hour per frying pot, during which time the fryer is out of production. In filtering systems where the oil must be cooled prior to filtering, the fryer may be out of use for as much as four hours.

As mentioned above, particulates or "dirt" in the filter encourages the breakdown of the oil and shortens the usable life of the oil. Once the oil is unusable it must be discarded and replaced. It is believed that if the oil is continuously filtered, the life of the oil can be extended. Therefore some continuously filters have been developed. However, the known continuously filters are relatively expensive such that these filters are only economical to large poultry producers and large retail fried food producers and out of reach of many operators. Also, the known continuously filters require pressurized air which is often not available in locations, such as restaurants or other retail establishments.

SUMMARY

Embodiments of the present invention provide a filter assembly and an associated valve assembly. The filter assembly is configured to allow for the continuous filtering of the frying oil and the valve assembly is configured to selectively connect the filter assembly to one or more vats of frying oil.

According to an embodiment, a filter assembly for filtering a liquid is provided. The filter assembly includes a clean chamber, a dirty chamber, a clamping mechanism, and a pump. The clamping mechanism is configured to move at least one of the dirty chamber and the clean chamber between a closed position and an opened position. The clamping mechanism may include a toggle clamp and a linear actuator. In the closed position, the dirty chamber and the clean chamber are compressed together such as to form a seal around a first section of a filter media. In the opened position, the dirty chamber and the clean chamber are at least partially spaced apart to allow the removal of the first section of the media and the insertion of a second section of the filter media. The pump is configured to create a vacuum force to draw the liquid through the dirty chamber and the clean chamber such that the liquid is filtered through the filter media between the dirty chamber and the clean chamber during a filtering operation and to draw air through the dirty chamber and the clean chamber to facilitate removal of the liquid from the dirty chamber and the clean chamber during an evacuation operation.

The filter assembly may further include a valve arrangement having a first configuration and a second configuration. In the first configuration, the valve arrangement opens a passageway for the liquid to enter into the clean chamber and blocks a passageway for the air to enter into the clean chamber. In the second configuration, the valve arrangement blocks the passageway for the liquid to enter into the clean chamber and opens the passageway for the air to enter into the clean chamber. The valve arrangement may be a three-way valve.

The filter assembly may further include a motor configured to advance the filter media through the filter assembly including between the dirty and clean chambers in the opened position.

The filter assembly may further include a controller configured to selectively energize the pump, the valve arrangement, and the clamping mechanism. The controller may be configured to selectively energize the pump, the three-way valve, and the clamping mechanism based on a time cycle, a vacuum differential, or both.

The filter assembly may further include a frame and one or more enclosure sheets for forming an enclosure and a supply reel for supporting and storing one or more clean filter media sections. The supply reel is at least partially within the enclosure such that the clean filter media sections are at least partially protected from exterior containments. In the closed position, the clean and dirty chambers may have a horizontal orientation.

In another embodiment, a valve assembly configured to selectively connect the filter assembly to a plurality of vats of the liquid. The valve assembly includes a first valve, a second valve, an actuator, and a linking member. The first valve is configured to selectively connect a first line extending from the filter assembly to the first valve to one of a plurality of clean lines. Each clean line extends from the first valve to one of the plurality of vats. The second valve is configured to selectively connect a second line extending from the filter assembly to the second valve to one of a plurality of dirty lines. Each dirty line extends from the second valve to one of the plurality of vats. Each of the first valve and the second valve may be a five-ported valve. The actuator is configured to provide a force. The linking member is configured to translate the force provided by the actuator onto each of the first valve and second valve such that the first valve and the second valve have equal movements.

According to another embodiment of the valve assembly, each of the first valve and the second valve may include a housing and a valve member. The housing may define a first port, a second port, and a third port. Each port may be configured to receive an end of a line extending to either the filter assembly or one of the plurality of vats. The valve member may be configured to provide a passageway between the first port and one of the other ports. The linking member may be configured to link the first valve and the second valve together such that a movement of the valve member of the first valve causes an equal movement of the valve member of the second valve.

The valve assembly may further include an actuator configured to provide a force for moving the valve member of the first valve. Each of the first valve and the second valve may further include a fourth port and a fifth port. The linking member may further include a first gear rotatably coupled to the first valve, a second gear rotatably coupled to the second valve, and a chain linking the first and second gears together.

In another embodiment, a combination of a filter assembly and a valve assembly is provided.

BRIEF DESCRIPTION OF THE SEVERAL VIEWS OF THE DRAWING(S)

FIG. 2 is a side view of the filter assembly of FIG. 1 with the enclosure sheets removed and in a closed configuration;

FIG. 3 is the side view of the filter assembly of FIG. 1 with the enclosure sheets removed and in an opened configuration;

DETAILED DESCRIPTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Embodiments of the present invention relate to and provide a filter assembly. The filter assembly is configured to allow for the continuous filtering of the frying oil, while the fryer is in operations (i.e., frying food). The filter assembly may include a dirty chamber, a clean chamber, a pump configured to suck the frying oil through the chambers, and a toggle clamp configured to move the filter assembly between a closed configuration and an opened configuration. In the closed configuration, the filter assembly is configured to support and seal a portion of a filter media between the two chambers. In a filtering operation, the pump sucks oil into the dirty chamber and through the filter media and into the clean chamber in order to filter dirt from the oil. During an evacuation operation (also referred to as a dry cycle), residual oil is moved out of the chamber. Once the filter media portion between the chambers is dirtied and after the evacuation operation, the filter assembly may be placed in the opened configuration. In the opened configuration, the filter assembly is configured to allow the removal of now dirtied filter media portion from between the chambers and the insertion of a new clean filter media portion. The removal or discharge of the dirtied filter media portion from between the chambers is referred as a discharge operation.

Figure 1:
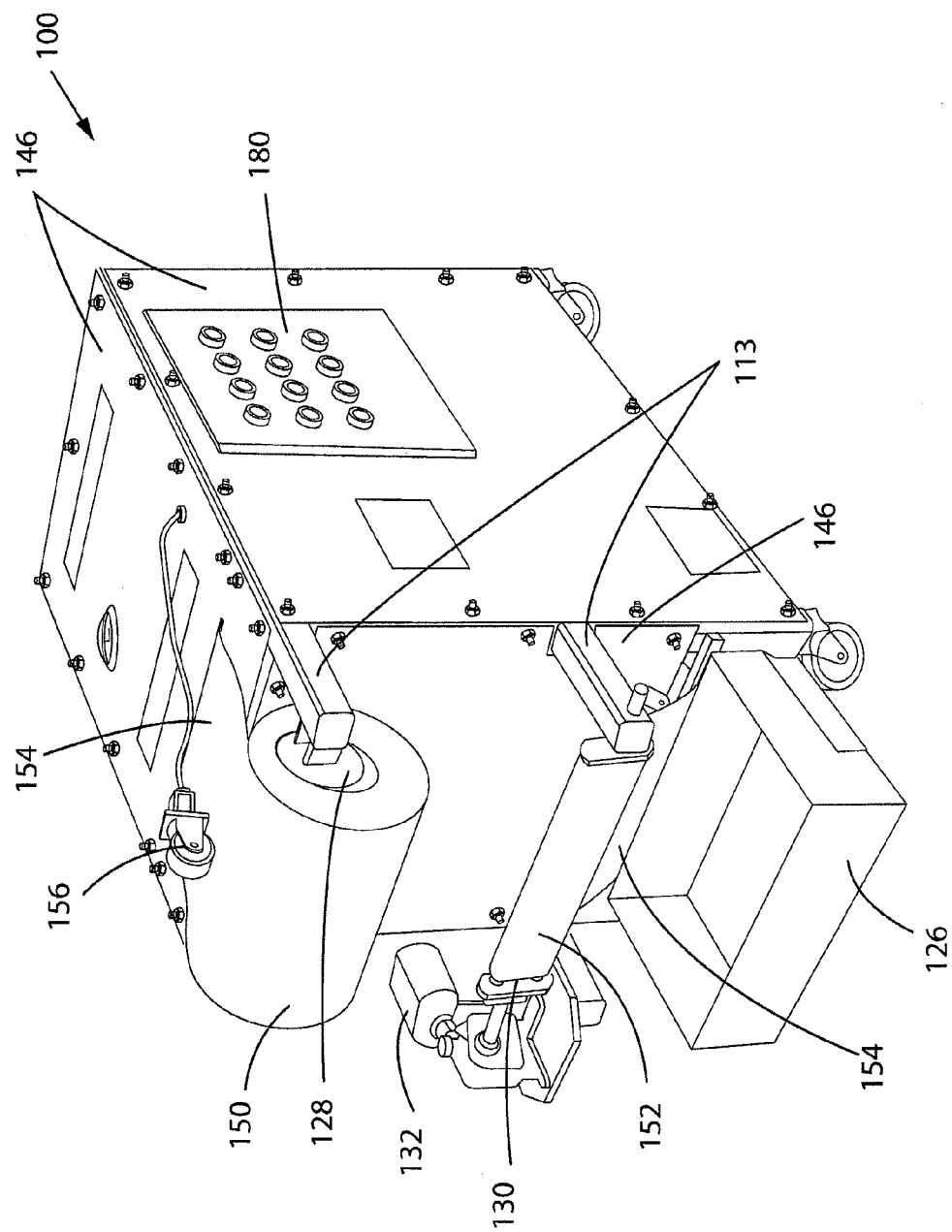
FIG. 1 is a perspective view of a filter assembly according to an exemplary embodiment.

FIG. 1 through FIG. 3 illustrate an exemplary embodiment of the filter assembly. According to this illustrated embodiment, the filter assembly 100 includes a frame 112, a pump 114, a linear actuator 116, a toggle clamp 118, a three-way valve 120, a first chamber (also referred to herein as the dirty chamber 122), and a second chamber (also referred to herein as the clean chamber 124). The filter assembly may further include a crumb box 126, a supply reel 128, a pick-up reel 130, and a re-roller motor assembly 132.

During operations, the liquid being filtered, e.g, frying oil, may travel through one or more of the elements of the filter assembly 100. The frying oil may be delivered from the fryer to the filter assembly 100 to and through the three-way valve 120 and then to the dirty chamber 122 to the clean chamber 124 and then to and through the pump 114 and back to the fryer.

The filter assembly 100 further includes one or more lines (e.g., flexible or rigid tubes hoses, or pipes) for allowing the frying oil to travel through and to the three-way valve 120, the dirty and clean chambers 122, 124 and the pump 114. Together the lines and the three-way valve 120, the dirty and clean chambers 122, 124 and the pump 114 define the "plumbing" or the passageway of which the oil travels from an inlet 134 of the filter assembly to an outlet 136 of the filter assembly.

For example, as illustrated, the filter assembly may include a first line 138 that extends from the inlet 134 to the three-way valve 120, a second line 140 that extends from the three-way valve 120 to the dirty chamber 122, a third line 142 that extends from the clean chamber 124 to the pump 114, and a fourth line 144 that extends from the pump 114 to the outlet 136. One of more sections of one or more of the lines may be a stainless steel braided hose that is Telfon® lined. For example, a section of the second line 140 may be a stainless steel braided hose that is Telflon® lined to help accommodate the movement of the dirty chamber. As another example, the third line 142 may also have such a section.

The frame 112 includes one or more support members. In general, the support members 113 are configured to withstand the potential clamping force exerted between the chambers. The support members 113 provide support to one or more of the elements of the filter assembly. More specifically, one or more of the elements may be attached to one or more of the support elements. The support members may be made from heavy walled structural tubing and may be made from various materials. As an example, the support elements may be made from carbon steel. As another example, the support elements may be made from stainless steel. Also, to keep cost down, the support members may be made from commercially available material.

As shown in FIG. 1, the filter assembly may include one or more sheets 146 of material attached to the frame (in FIG. 2 and FIG. 3 the sheets are removed for illustrative purposes). Together the sheets of material 146 (also referred to as enclosure sheets) and the frame 112 define at least a partial enclosure 148 for one or more of the elements of the filter assembly. The enclosure 148 may help to keep clean some of these elements and/or protect operators from these elements especially during the operation of the elements. However for some of the elements of the filter assembly, it may be more beneficial to keep the elements outside of the enclosure to allow easier access to these elements. For example in the illustrated embodiment of FIG. 1 through FIG. 3, the supply and pick-up reels and the re-roller motor assembly are outside the enclosure. Moreover, at least one of the elements, such as the crumb box 126, may be accessible even though it is mostly in the enclosure. In particular, an end of the crumb box 126 is accessible to an operator such that the operator can remove the crumb box 126 from the enclosure in order to clean out the crumb box.

The filter assembly 100 also defines a media path. In particular, the supply reel 128 is configured to receive a roll of media, referred to herein as a clean media supply roll 150. The media 154 is routed through the filter assembly such that a section or a portion of the media 154 is between the dirty and clean chambers 122, 124 along with a seal as best seen in FIG. 2 and FIG. 3. Beyond the chambers 122, 124, the media is routed further to a roll on the pick-up reel referred to herein as the dirty media roll 152. The re-roller motor assembly 132 is configured to pull or otherwise move the media from the clean media supply roll 50 to the dirty media roll 152. For example, an end of the media may be attached to the pick-up reel and the re-roller motor assembly 132 may rotate the pick-up reel for advancing the media toward the pick-up reel 130.

Media, also referred to as filter media, may be paper, nonwoven synthetic material or other sheet-like material configured to prevent the passage of any particulates or matter above a certain size (e.g., 5 microns) while letting particulates or matter below that size pass through. As a further example, the media may be a nonwoven synthetic material, made primarily of polyester or rayon or a combination of polyester and nylon. The basis weight of the media may be 0.8 oz/square yard and higher.

As further explained below, the filter assembly 100 may have a first configuration, referred to herein as the closed configuration, and a second configuration, referred to herein as the opened configuration. In the closed configuration, e.g., as illustrated in FIG. 2, the dirty and cleaned chambers 122, 124 are compressed together for filtering operations. In the opened configuration, e.g., as illustrated in FIG. 3, the dirty and cleaned chambers 122, 124 are at least partially spaced apart or uncompressed such that the media 154 can move between the two 122, 124. The opened configuration allows for the discharging of dirty media and the insertion of clean media between the two chambers.

In the illustrated embodiment of FIG. 1 through FIG. 3, the linear actuator 116 and the toggle clamp 118 provide a clamping mechanism or means for selectively compressing the dirty and clean chambers 122, 124. More specifically, the toggle clamp 118 moves the dirty chamber 122 between a first position, e.g., as illustrated in FIG. 2, in which the dirty chamber 122 is compressed against the clean chamber 124 and the filter assembly is in the closed configuration and a second position, e.g., as illustrated in FIG. 3, in which the dirty chamber 122 is at least partially spaced from the clean chamber 124 and the filter assembly is in the opened configuration. The toggle clamp 118 has been found to be a useful mechanism for clamping or compressing the chambers 122, 124 together with enough force to help form an effective seal between the chambers 122, 124 even with the filter media extending between the two.

In the illustrated embodiments, the toggle clamp includes a first clamping member and a second clamping member. The inner ends of the two clamping members are pivotally connected. The outer end of the first clamping member is pivotally connected to the frame of the filter assembly. The outer end of the second clamping member is pivotally connected to the dirty chamber. The linear actuator is configured to engage the clamping members moving them between a locked configuration in which the two chambers are compressed together and an unlocked configuration in which the two chambers are spaced apart. This toggle clamp linkage is inexpensive, requires few parts, and is relatively easy to maintain compared to typical filter assemblies. Also, the toggle clamp is able to maintain the seal between the chambers 122, 124 even in the event of a power loss, which may be viewed as a safety feature of the filter assembly.

In other embodiments, different clamping mechanism may be used. For example, the clamping mechanism may include a hydraulic cylinder, pump and actuator where the hydraulic force from the pump drives the dirty chamber against the clean chamber via the actuator. As another example, an electric motor may be used to provide the clamping force or drive a "jack screw" mechanism." And yet another example is an air cylinder or air bag that is actuated or inflated by compressed air.

In the illustrated embodiments, the clean chamber is stationary as the dirty chamber is moved between the first and second positions by the toggle clamp. However, in other embodiments, the clean chamber may be the moveable chamber via a clamping mechanism, such as a toggle clamp, and the dirty chamber may be stationary. In yet other embodiments, both the clean and dirty chambers may be moveable between compressed and spaced positions via one or more clamping mechanisms.

FIG. 4 through FIG. 6b illustrates another exemplary embodiment of a filter assembly 200 according to the present invention. According to the embodiment illustrated in FIG. 4 through FIG. 6B, the filter assembly 200 includes a frame 212, a pump 214, a linear actuator 216, a toggle clamp 218, a three-way valve 220, a dirty chamber 222, and a clean chamber 224. The filter assembly may further include a crumb box 226, a supply reel 228, a pick-up reel 230, and a re-roller motor assembly 232. (In FIGS. 6A and 6B, the frame of the filter assembly is removed for illustrative purposes.)

In general, the elements of the illustrated embodiment of FIG. 4 through FIG. 6B may function in the same manner as the corresponding elements of the illustrated embodiment of FIG. 1 through FIG. 3. For example, in the illustrated embodiment of FIG. 4 through FIG. 6B. The filter assembly 200 defines a media path. The supply reel 228 is configured to receive a clean media supply roll 250. The media 254 is routed through the filter assembly such that a section of the media 254 is between the dirty and clean chambers 222, 224. Beyond the chambers 222, 124, the media is routed further to a dirty media roll 252. The re-roller motor assembly 232 is configured to pull or otherwise move the media along a media path or feed path from the clean media supply roll 250 to the dirty media roll 252.

Figure 4:
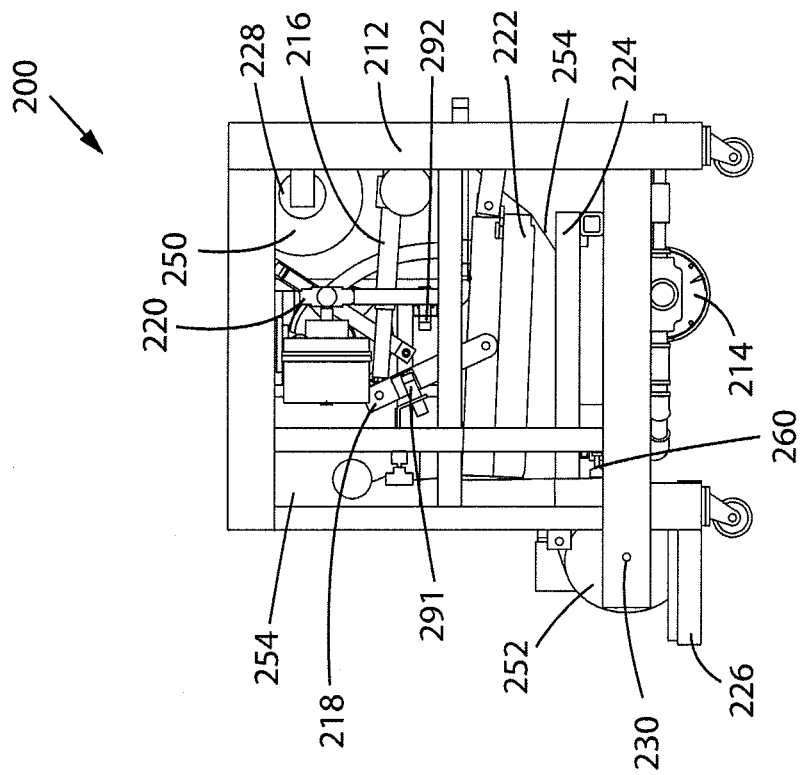
FIG. 4 is a side view of a filter assembly according to another exemplary embodiment of the present invention in an closed configuration.
Figure 5:
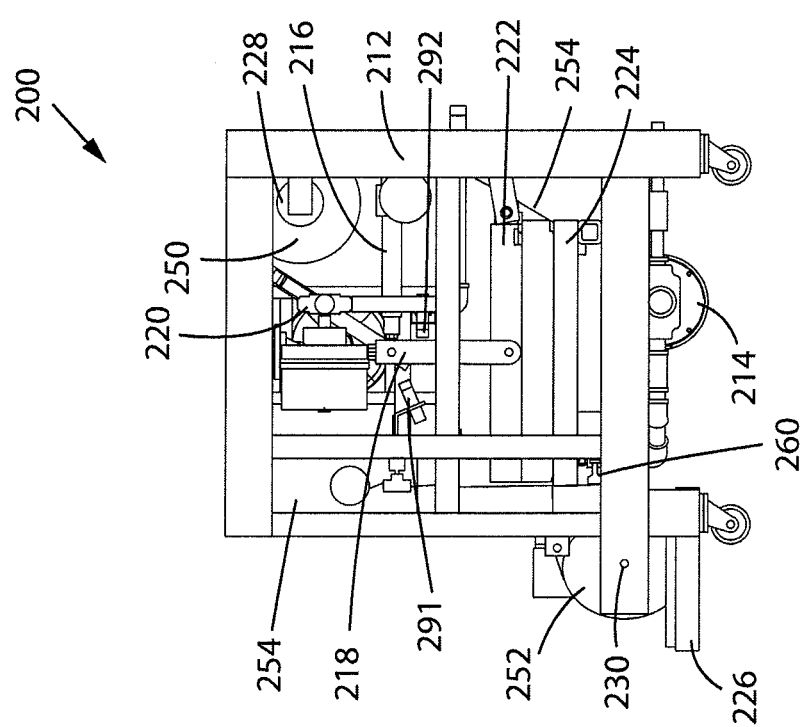
FIG. 5 is the side view of the filter assembly of FIG. 4 in an opened configuration.
Figure 6B:
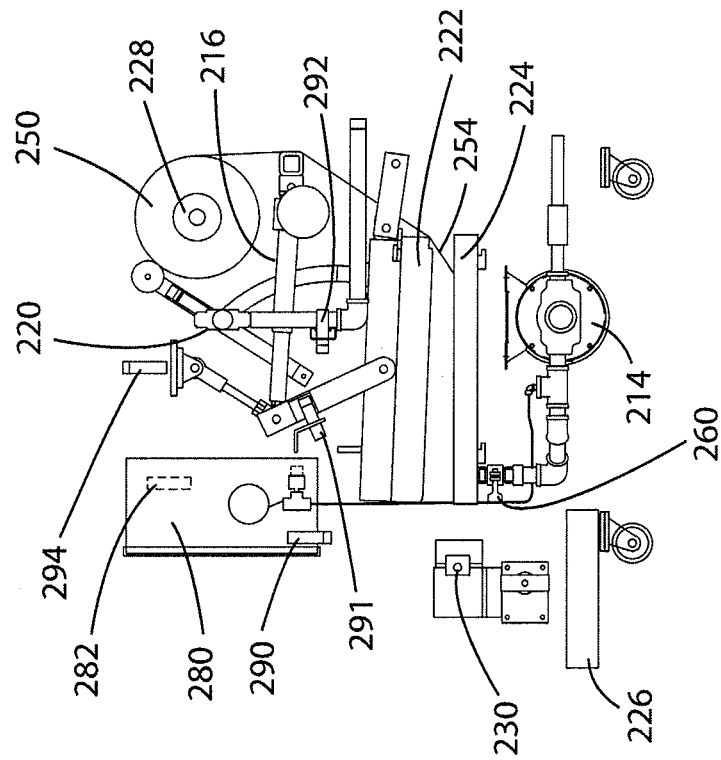
FIG. 6b is the same view as FIG. 5 with the frame removed from illustrative purposes.
Figure 6A:
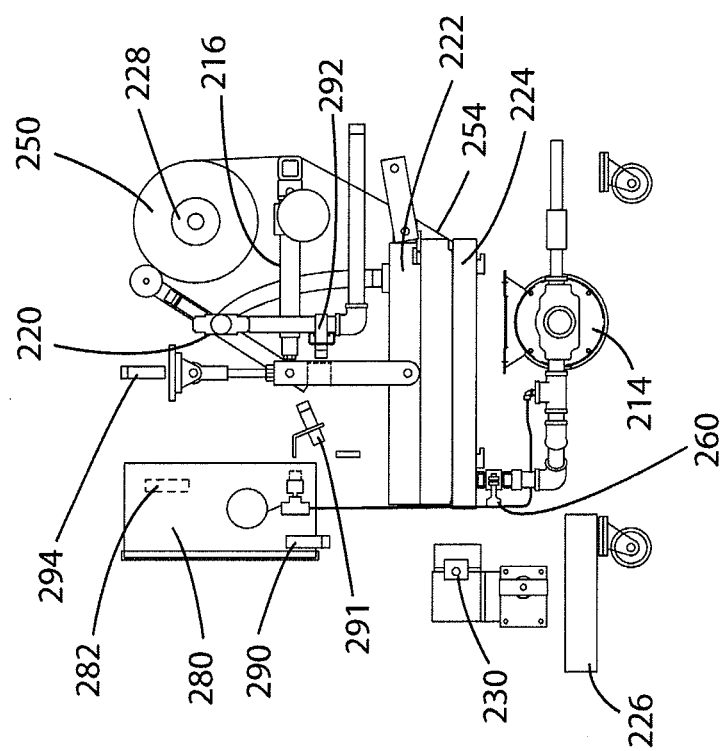
FIG. 6a is the same view as FIG. 4 with the frame removed for illustrative purposes.

The filter assembly 200 includes a closed configuration, e.g., as illustrated in FIG. 4 and FIG. 6A, and an opened configuration, e.g., as illustrated in FIG. 5 and FIG. 6B. In the closed configuration, the dirty and cleaned chambers 222, 224 are compressed together for filtering operations. In the opened configuration, the dirty and cleaned chambers 222, 224 are at least partially spaced apart such that the media 154 can move between the two 222, 224. The opened configuration allows for the discharging of dirty media and the insertion of clean media between the two chambers. The linear actuator 216 and the toggle clamp 218 provide a clamping mechanism or means for selectively compressing the dirty and clean chambers 122, 124 together, e.g., moving one or both of the dirty and clean chambers 222, 224 between the opened and closed positions.

The orientation dirty and clean chambers of the filter assembly may vary. As examples, in the illustrated embodiment of FIG. 1 through FIG. 3, the dirty and clean chambers 122, 124 have a vertical orientation. In the illustrated embodiment of FIG. 4 through FIG. 6B, the dirty and clean chambers 222, 224 have a horizontal orientation. The horizontal orientation may help to maximize the oil flow from the dirty chamber 222 to the cleaned chamber during the filtering operation and the evacuation operation and minimize the oil residual that may escape from between the chambers 222, 224 as the chambers are opened and closed during the discharged operation.

As discussed above, the filter assembly includes a frame that defines an enclosure with one or more enclosure sheets and that one or more of the elements may be in or out of the enclosure depending on safety and convenience considerations. Unlike the embodiment illustrated in FIG. 1 through FIG. 3, the clean media roll 250 of the embodiment illustrated in FIG. 4 through FIG. 6B is supported and held within the enclosure. Although placing the clean media roll 250 within the enclosure limits the access to the roll 250, it also helps shield the clean media roll 250 from possible containments prior to its use.

Figure 11B:
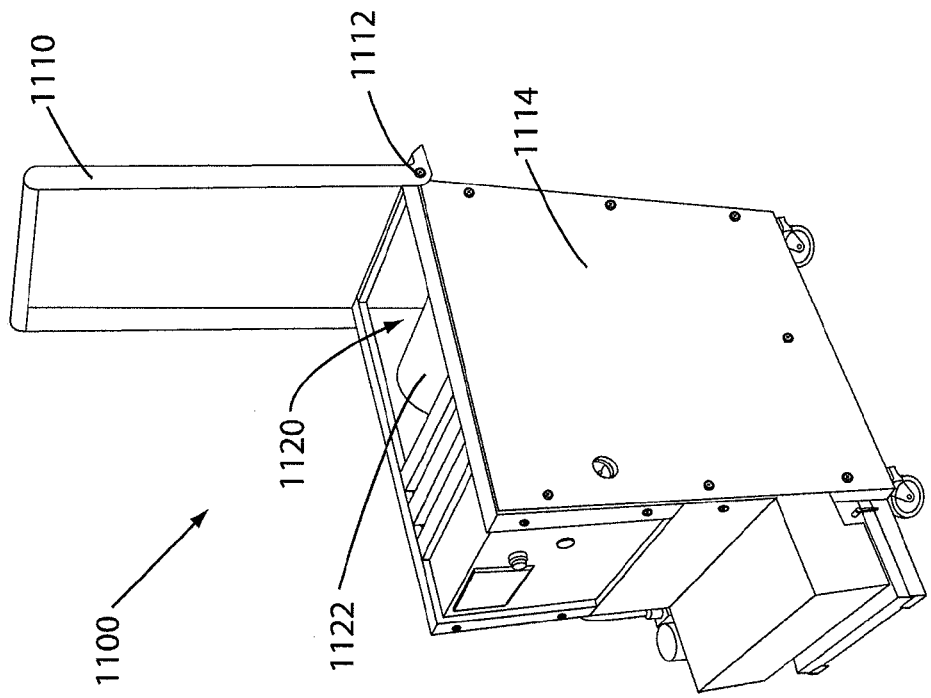
FIG. 11B is a perspective view of the filter assembly according to FIG. 11A with the top lid in a opened position.
Figure 11A:
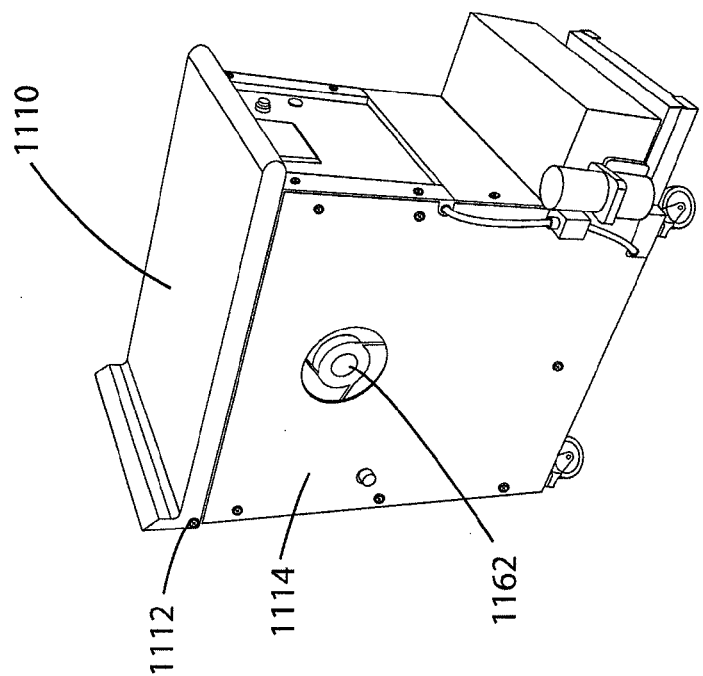
FIG. 11A is a perspective view of a filter assembly according to another embodiment with a top lid in a closed position.

In the embodiment illustrated in FIGS. 11a and 11b, the filter assembly 1100 includes a top enclosure sheet that forms a lid 1110. More specifically, according to this illustrated embodiment, an end 1112 of the lid is pivotally connected to a support member of the frame 1114 of the filter assembly allowing the lid 1110 to move between an opened position, as illustrated FIG. 11A, and a closed position, as illustrated in FIG. 11B. In the opened position, the lid 1110 provides an opening or access to the enclosure 1120 of the frame assembly including to the clean media roll 1122. In the closed position, the lid closes the opening and forms part of the enclosure along with the other enclosure sheets.

The interconnections between the piping and elements may be at least partially formed or supported through quick-changed clamps, i.e., clamps configured to be secured and released without the use of tools. For example and as illustrated in FIG. 4 through FIG. 6B, one or more sanitary tri-clamp fittings 260 may be used. The use of such fittings may allow for the easy removal and reattachment of the elements from the rest of the filter assembly during maintenance or cleaning operations.

As a specific example, at least one of the dirty chamber and the clean chamber may be connected through one or more quick-changed clamps. An operator may be able to remove the dirty chamber or the clean chamber by releasing the clamps and then removing (e.g., pulling) the chamber from the frame assembly. Moreover, at least one of the dirty chamber and the clean chamber may be dimensioned such that it fits into a conventional dishwasher, such as a dishwasher commonly found in a restaurant, allowing the dirty chamber, the clean chamber, or both to be washed in a dishwasher. At least one of the dirty chamber and the clean chamber may be made from aluminum (e.g., anodized aluminum) allowing the chamber or chambers to be relatively light making it easier to handle the chamber or chambers.

The filter assembly may further include one or more cooling fans. For example and as illustrated in FIG. 11A and FIG. 11B, the filter assembly 1100 may include a fan assembly 1162 configured to circulate air within the enclosure 1120 to help cool the elements of the filter assembly during operations.

The operations of the filter assembly according to the illustrated embodiments of FIG. 1 through FIG. 6B will now be explained in more detail. As mentioned above, for filtering operations, the dirty chamber and clean chamber have a section of the media. The dirty and clean chamber are be "clamped" together via the toggle clamp linkage and linear actuator. When the chambers are clamped together in the closed position, the section of media is trapped and sealed between the two chambers. The pump energizes and sucks the dirty oil from a fryer vat to the filter assembly. The dirty oil travels through the three-way valve assembly, into the dirty chamber, passes through the media, where particulate and contaminants are captured. The oil passes through the media into the clean chamber then flows to the pump under a vacuum pressure created by the pump. Once at the pump, the now cleaned or cleaner oil travels under pressure back to the fryer.

The operations of the filter assembly may be controlled by a controller (e.g., a programmable logic controller or a PCB/dedicated controller) of the filter assembly. For example, according to the exemplary embodiment illustrated in FIG. 1, the filter assembly includes a control box 180 that includes a housing and controller along a side of the filter assembly 100. According to the exemplary embodiment illustrated in FIG. 4 through FIG. 6, the control box 280 with the controller 282 is located at the front end of the filter assembly. The controller may be configured to run the filtering operation until a time cycle has completed or until a vacuum differential pressure has been reached. Once either a time cycle has been completed or a vacuum differential has been reached, the controller may be configured to run a discharge operation. In some embodiment, the filter assembly may include a vacuum switch to monitor the vacuum differential.

The discharge operation may include the three-way valve changing positions to allow air to be sucked into the plumbing of the filter assembly. Other embodiments may include a different valve arrangement, e.g., two individual valves may be used. However, the three-way valve may be preferred in some embodiments due to cost, control, size, and safety considerations. Allowing air into the plumbing facilitates the removal of any oil in the clean and dirty chambers prior to removing the clamping force between the two chambers. In the illustrated embodiments, the air that is sucked into the plumbing is at atmospheric pressure. In other words, the air is not pressurized (beyond the natural pressure of the local environment). Once the oil has been removed based on a timed cycle the pump may be turned off.

After the pump is turned off, the linear actuator may be energized and extended. As shown in the illustrated embodiments, the extension of the linear actuator manipulates the mechanical linkage associated with the toggle clamp and opens or removes the clamping force between the two chambers. More specifically, according to the illustrated embodiments, the dirty chamber is pivoted away from the section of media and the clean chamber. Once opened, the re-roller motor assembly may be energized to pull the section of dirtied media from between the two chambers which may also allow for any crumbs and solids to fall into the crumb pan. The operation of the re-roller motor assembly may be based on a timed cycle such that the appropriate amount of media is advanced such that the dirty section is advanced past the chambers and a new clean section of media is positioned between the clean and dirty chambers. As another example, the operation of the re-roller motor may be based on a counter configured to determine the length of media being dispensed from the supply. The counter, such as counter 156 illustrated in FIG. 1, may include one or more proximity sensors configured to detect spaced screws on a wheel attached to an end of the roller. Moreover, the controller may be configured to monitor the counter in order to determine when the supply of clean media is empty and then trigger an alarm or shut down the operations of the frying assembly to prevent the filter assembly from operating without media.

The linear actuator may be energized in the reverse direction and retracted. As illustrated, the retraction of the linear actuator manipulates the mechanical linkage associated with the toggle clamp such that a clamping force is applied to the dirty and clean chambers. More specifically, according to the illustrated embodiments, the dirty chamber is pivoted against the new clean media section and the clean chamber. Once in the closed position as illustrated in FIG. 2 and FIG. 5, the three-way valve may change positions again, the pump may be energized again such that the oil is sucked backed into the filter assembly and the filtering operations may begin again. Again the operations described above including the discharge operations may be controlled as least partially by a controller of the filter assembly. The above sequences may continue until the filter assembly is turned off or the dirty media roll is full to capacity, or the clean supply roll is empty.

Figure 7:
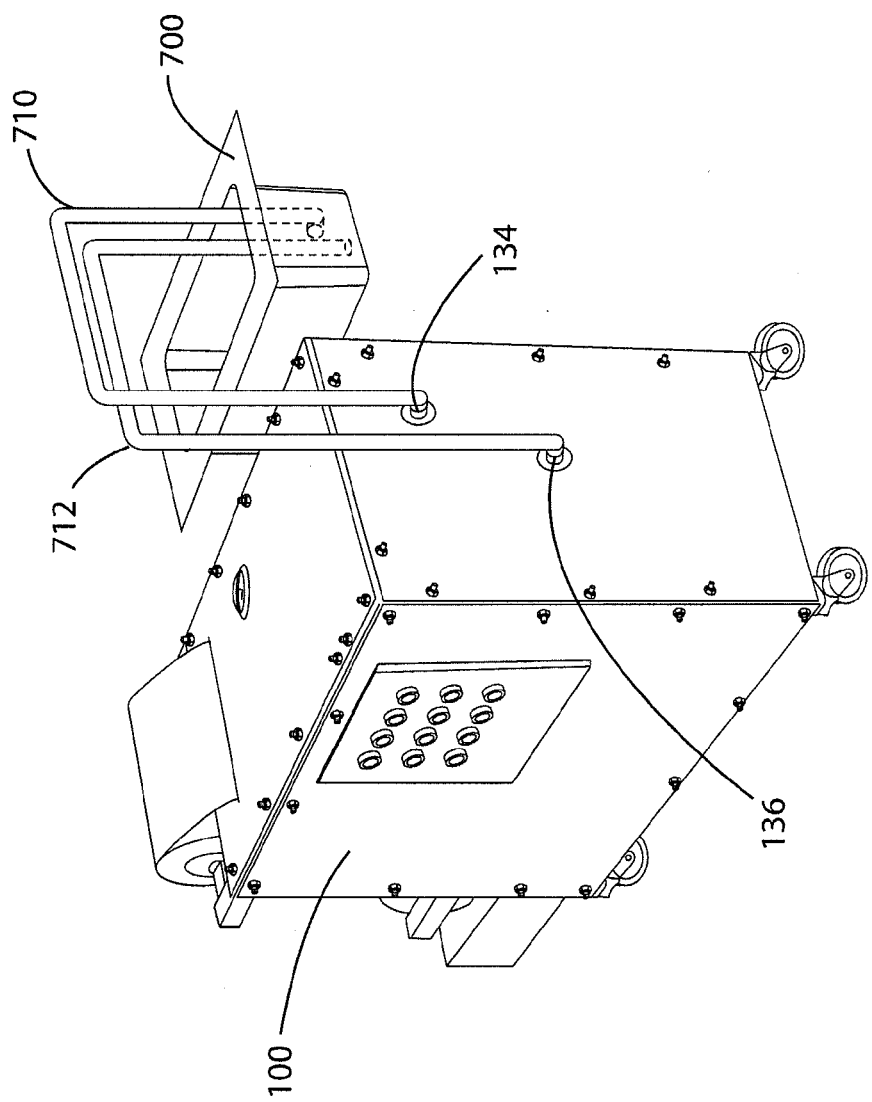
FIG. 7 is a schematic illustration of the filter assembly of FIG. 1, a vat, and the interconnections between the filter assembly and the vat.

FIG. 7 illustrates an example of the filter assembly 100 according to an exemplary embodiment configured to filter the oil from a fryer 700. In particular, a first line 710 (e.g., a pipe) extends from near the bottom of the fryer 700 to the inlet 134 of the filter assembly and a second line 712 (e.g., a pipe) extends from the outlet 136 of the filter assembly to the fryer. The first line 710 transfers the dirty or dirtier oil from the fryer 700 to the filter assembly 100 and thus may be referred to as a dirty line. As explained above, the oil is delivered through the plumbing of the filter assembly including through the media where the oil is filtered and back out the outlet 136 of the filter assembly. The second line 712 transfers the cleaned or cleaner oil from the filter assembly 100 back to the fryer 700 and thus may be referred to as a clean line.

Figure 8:
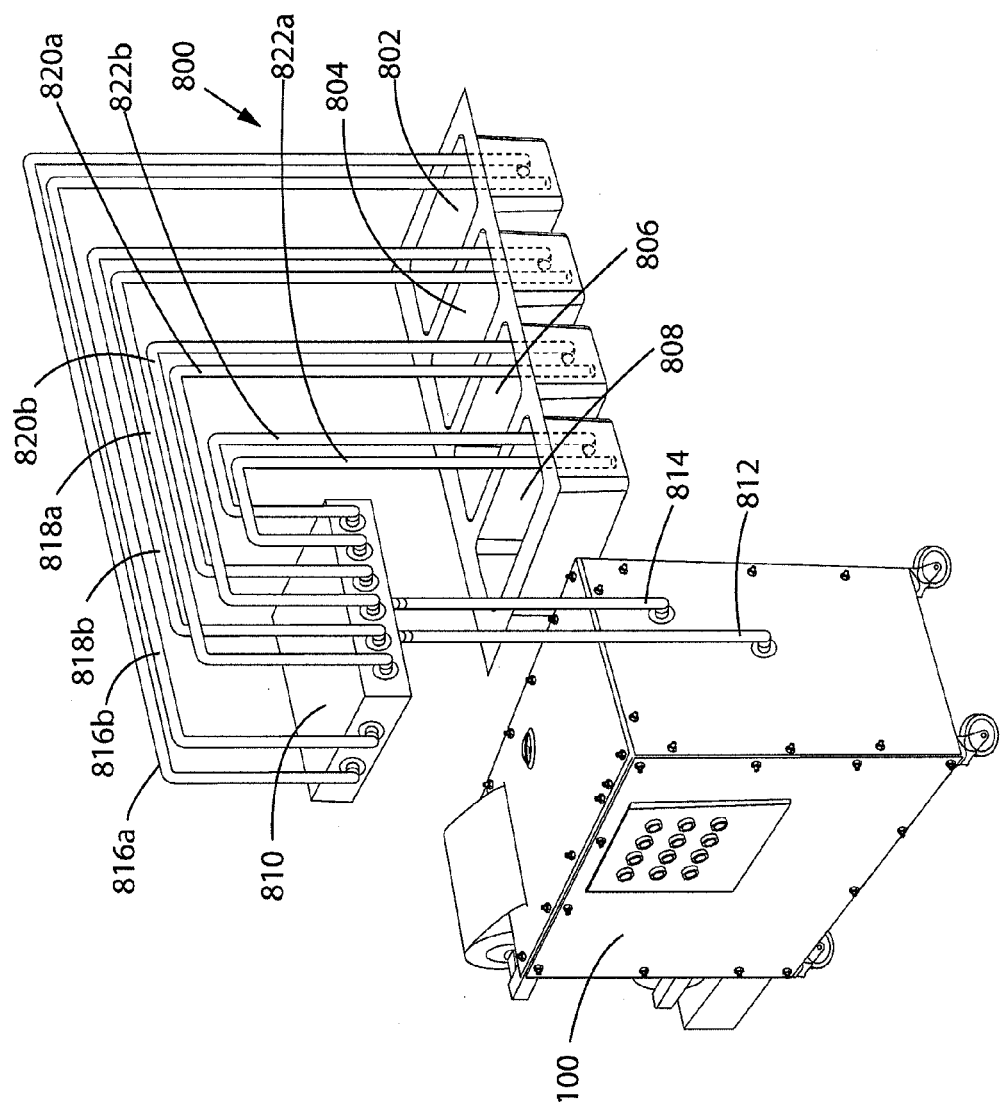
FIG. 8 is a schematic illustration of the filter assembly of FIG. 1, a plurality of vats, and the interconnections between the filter assembly and the vats, including a valve assembly according to an exemplary embodiment of the present invention.

Typically, a restaurant has a "fryer" that has multiple "sinks" or "vats" for segregating what the fryer is frying to avoid flavor transfer, and to be able to fry multiple foods at one time. Embodiments of the filter assembly may be configured to filter one or more separate vats of frying oil at a time. For example, according to the embodiment of FIG. 8, the filter assembly 100 is configured to filter up to four vats 802, 804, 806, 808, with the use of a valve assembly 810.

The valve assembly may be located at or near the fryer. By locating the valve assembly near the fryer, the length of plumbing, e.g., the sets of clean and dirty lines running toward the valve assembly, may be reduced. The valve assembly 810 may be connected to the filter assembly 100 through a clean line 812 and a dirty line 814. The valve assembly 810 may be connected to the fryer 800 through up to four sets of lines going to the fryer 800, each set to an individual vat 802, 804, 806, 808. Each set of lines may include a clean line and dirty line 816a, 816b, 818a, 818b, 820a, 820b, 822a, 822b.

Figure 9A:
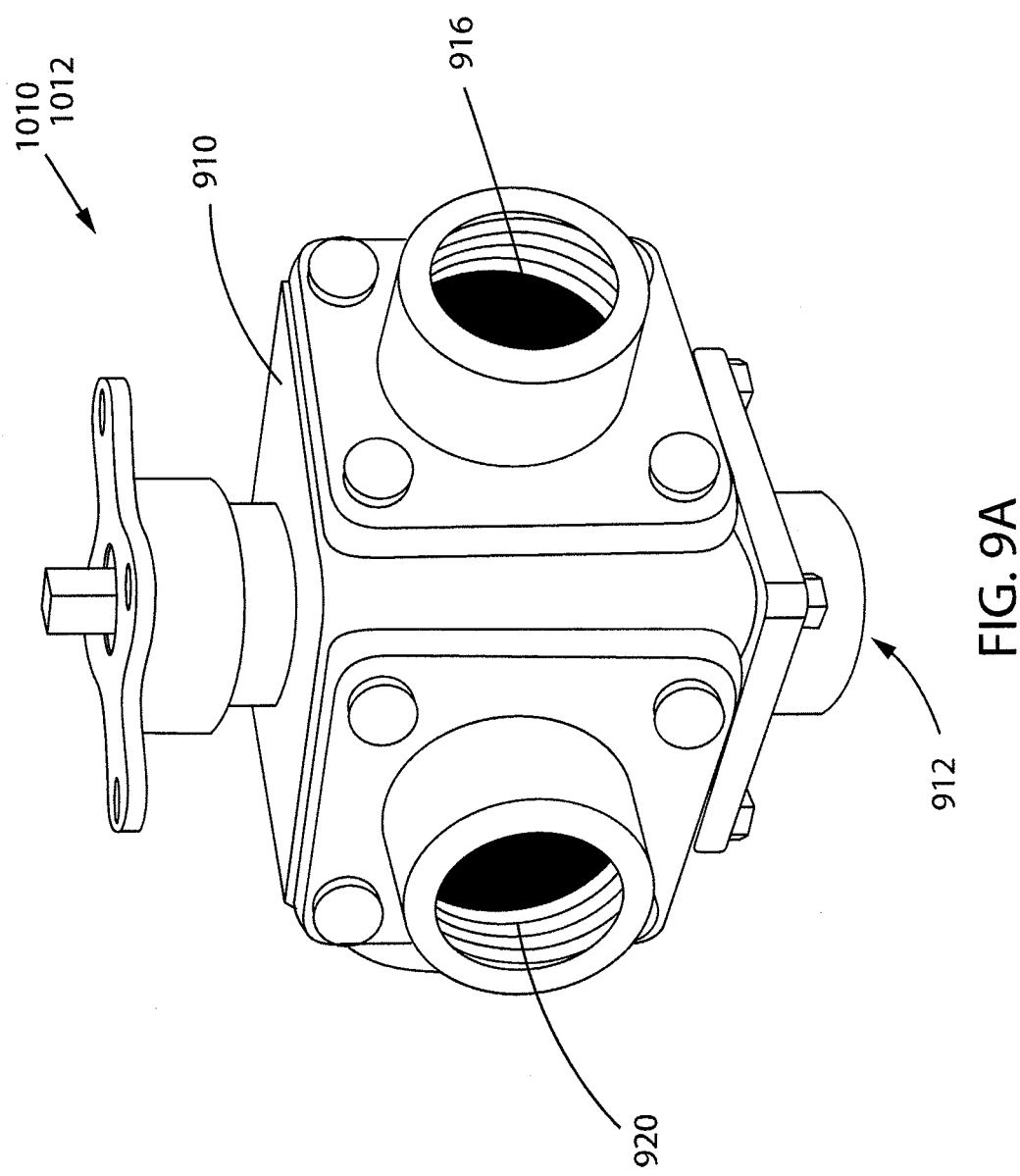
FIG. 9A is a perspective view of a five-ported valve housing.
Figure 9B:
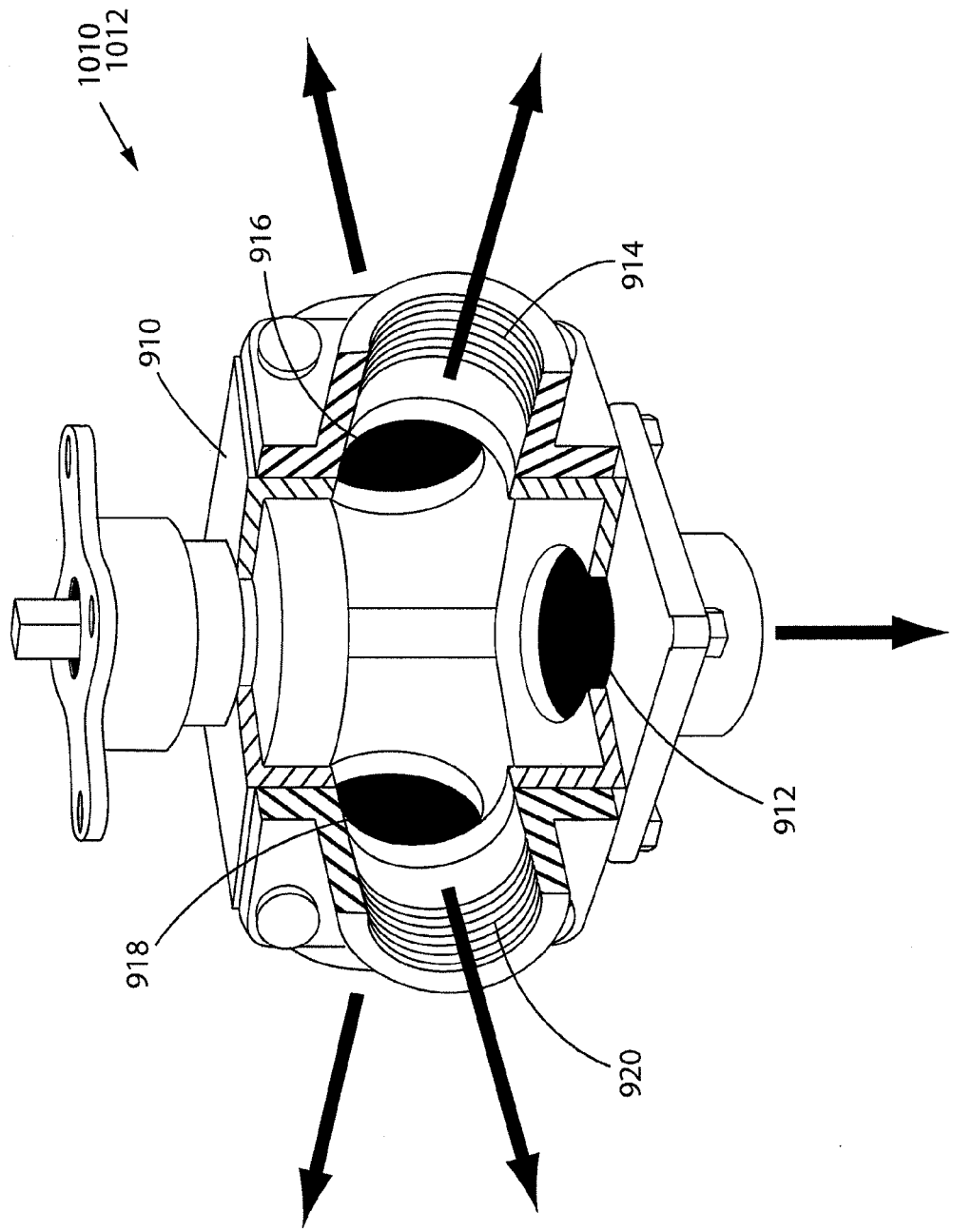
FIG. 9B is a cross-sectional view of the five-ported valve housing of FIG. 9A.
Figure 10:
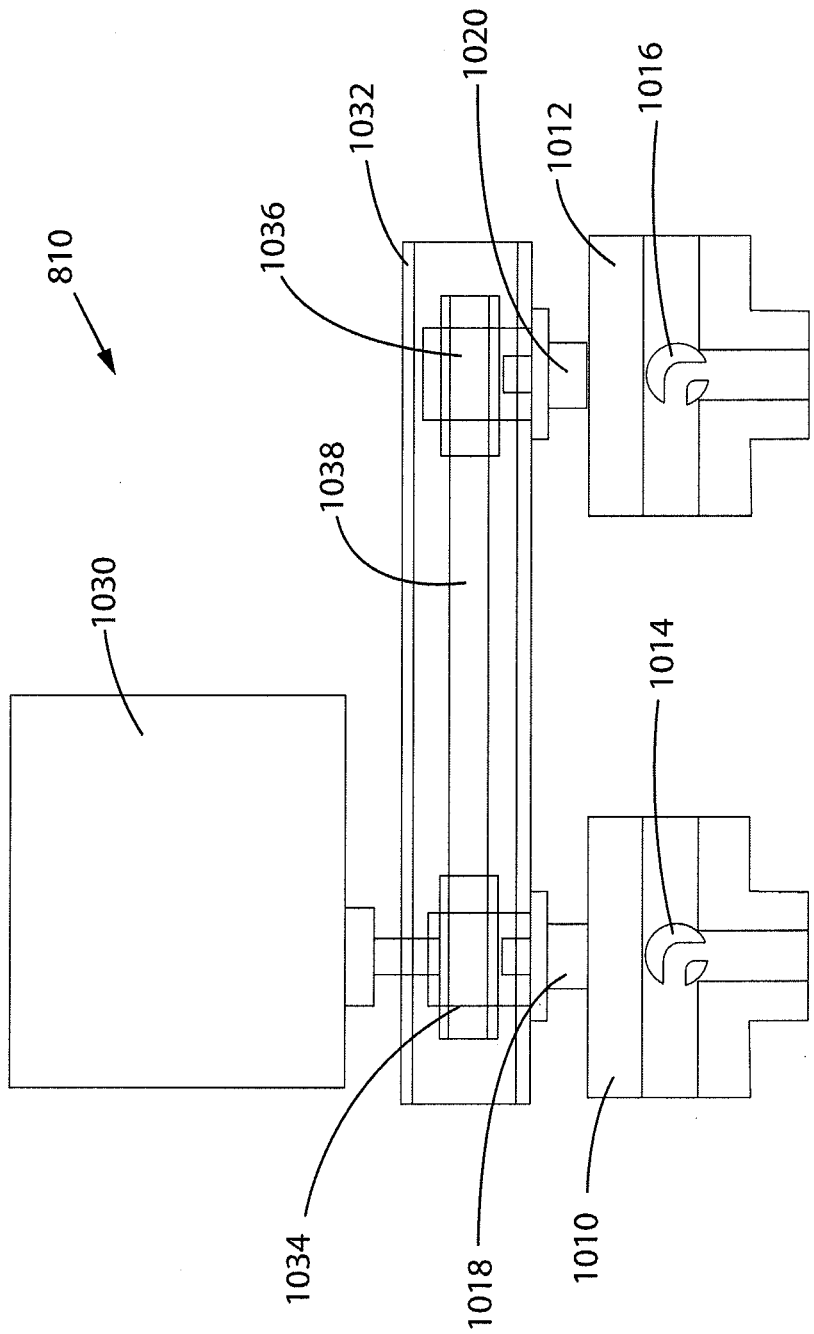
FIG. 10 is a schematic illustration of a valve assembly according to an exemplary embodiment of the present invention.

The valve assembly 810 is configured to selectively connect the filter assembly 100 to one of the vats 802, 804, 806, 808. For example and as illustrated in FIG. 9a through FIG. 10, the valve assembly may include a first five-ported valve 1010 and a second five-ported valve 1012. Each valve includes a valve housing 910 that defines five ports 912, 914, 916, 918, 920. The first valve 1010 is in communication with each of the clean lines. Specifically, each port of the first valve housing receives an end of a clean line such that all five clean lines (i.e., one from the filter assembly and four from the vats) extend into the first valve housing. Similarly, the second valve is in communication with each of the dirty lines. Specifically, each port of the second valve housing receives an end of a dirty line such that all five dirty lines (i.e., one from the filter assembly and four from the vats) extend into the second valve housing. Each valve 1010, 1012 further includes a valve member, such as a ball 1014, 1016. The ball or other valve member defines an interior passageway for connecting two of the ports together while blocking the other ports. Therefore, as oil enters the valve housing, the oil is directed from the first connected port to the second connected port and is blocked by the ball from reaching the unconnected ports.

In particular, in the illustrated embodiment, the ball 1014, 1016 defines an L-shaped passageway 1015, 1017 for connecting the first port in communication with the filter assembly with one of the other ports in communication with one of the vats. The ball is movable to at least four different positions. In each position, the L-shaped passageway is lined up between the first port and one of the other ports. In order to connect the filter assembly with one of the vats, the ball is moved until the L-shaped passageway is lined up between the port for that vat and the port for the filter assembly.

The valve assembly may further include an actuator 1030 and a linking member 1032. The actuator, e.g., an electric motor, is configured to provide the force to move the valve members. The linking member is configured to translate that force from the actuator onto both valves such that the valve members of the valves move together. Specifically, each valve member 1014, 1016 may be rotatably coupled to a stem 1018, 1020 such that rotation of the stem creates a rotation of the valve member. The linking member may include a first gear 1034, a second gear 1036, and a chain 1038 rotatably linking the first gear and the second gear together. A shaft of the actuator 1030 may be rotatably coupled to the first gear such that as the shaft of the actuator rotates that rotation is translated as a rotation in both the valves. Moreover, the rotation in one valve may be equal to the rotation in the other embodiment.

A controller, e.g., the controller 282 of the filter assembly, may be configured to control the operations of the valve assembly such that the filter assembly will continuously filter each vat for set period of time in sequence. The set period of time may be adjusted or set by an operator. In such embodiment, the controller may send instructions or activate or energize the actuator in order to change the valve configurations and cycle through each of the vats.

The filter assembly may include one or more proximity sensors. For example, according to the embodiment illustrated in FIG. 6A and FIG. 6B, the filter assembly 200 may include a first proximity sensor 290 located near a front enclosure sheet configured to detect the presence of the front enclosure sheet and a second proximity sensor 294 located near the top enclosure sheet (or a lid 1110 as illustrated in FIG. 11A and FIG. 11B) to detect the presence of the top enclosure sheet. As a safety feature, the controller may prevent the operations of the filter assembly when either the front enclosure sheet or the top enclosure sheet is missing which is detectable by the first and second proximity sensors. The front and top enclosures sheets may be configured to be readily removable by an operator for maintenance, cleaning, or reloading purposes. The use of the proximity sensors helps to ensure these enclosure sheets are reinstalled prior to the operation of the filter assembly. Similarly, the filter assembly may include other proximity sensors configured to detect the presence, or lack thereof, of one or more other enclosure sheets.

The filter assembly may further include proximity sensors to detect the positions of one or more of the chambers or to determine whether the filter assembly is in the opened configuration or the closed configuration. For example and as illustrated in FIG. 6A and FIG. 6B, the filter assembly 200 includes a third proximity sensor 291 and a fourth proximity sensor 292. The third and fourth proximity sensors 291, 291 may be located near and configured to detect the position of the toggle clamp which allows the controller to determine the configuration of the filter assembly.

The filter assembly described herein may allow for the filtering of the oil continuously while frying which minimizes the downtime for a fryer and extends the useable life of the oil. Also, the filter assembly may be effective in filtering down to relative small sizes of particulates or dirt. For example, in one embodiment the filtering assembly may filter down to the one to five micron range. The size at which the filter assembly can filter a particulate may be generally a function of the media and build up (e.g., dirt) on the media. Also, the filter assembly may be substantially automatic in that the filter assembly may be configured to change out the dirty media and thus the filter assembly requires less work from the operator than in some conventional filters. For the illustrated embodiment, the filter assembly may work with 120 V AC single phase power and not require any air or hydraulics, which makes the filter assembly relatively inexpensive to operate and maintain. With the use of the "toggle clamp" design to "clamp shut" the two chambers, embodiments of the filter assembly provide an intrinsic safety feature in that the seal between the two chambers is maintained even in the event of a power loss. Also, the valve assembly allows for the filtering of a plurality of vats and the linking member allows for the control of the two separate valves with a single actuator. In the illustrated embodiment, a single pump is placed downstream of the clean and dirty chambers for creating a vacuum force. The vacuum force has been found effective to draw oil and atmospheric air through the plumbing of the filter assembly without the need to use pressurized air or otherwise require a second force for the evacuation operation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A valve assembly configured to selectively connect a filter assembly with a plurality of vats, the valve assembly comprising:
    a first valve and a second valve, each of the first valve and the second valve having a housing and a valve member, wherein each housing defines a first port, a second port, and a third port and each port is configured to receive an end of a line extending to either the filter assembly or one of the plurality of vats, and wherein each valve member is configured to provide a passageway between the first port and one of the other ports of the respective valve;
    a linking member configured to link the first valve and the second valve together such that a movement of the valve member of the first valve causes a corresponding movement of the valve member of the second valve; and
    an actuator configured to provide a force for moving the valve member of the first valve such that dirty oil from a selected one of the plurality of vats is received via the second valve, the dirty oil is conveyed from the second valve to the filter assembly, filtered oil is conveyed from the filter assembly to the first valve, and the filtered oil is conveyed from the first valve to the selected one of the plurality of vats in a filtering operation,
    wherein the filtering operation continuously filters oil from the selected one of the plurality of vats such that the selected one of the plurality of vats is usable during the filtering operation.

2. The valve assembly of claim 1, wherein one port of the first valve is configured to receive filtered oil from the filter assembly and the other ports of the first valve are configured to convey the filtered oil to a selected one of the plurality of vats, and wherein one port of the second valve is configured to convey dirty oil to the filter assembly and the other ports of the second valve are configured to receive the dirty oil from the selected one of the plurality of vats.

3. The valve assembly of claim 1, wherein each valve member is configured such that one port remains connected to the filter assembly and each of the other ports is selectively coupled to one of the plurality of vats.

4. The valve assembly of claim 1, wherein each valve member is a ball valve member that defines an L-shaped passageway.

5. The valve assembly of claim 1, wherein the linking member comprises a first gear, a second gear, and a chain rotatably linking the first and second gears together.

6. The valve assembly of claim 5, wherein each valve member is coupled to a stem such that rotation of the stem creates rotation of the respective valve member, and wherein the first gear is coupled to the stem of the valve member of the first valve and the second gear is coupled to the stem of the valve member of the second valve.

7. The valve assembly of claim 6, wherein the actuator comprises a shaft, and the shaft of the actuator is coupled to the first gear such that as the shaft of the actuator rotates, the linking member translates the rotation into a rotation of the valve members.

8. The valve assembly of claim 1 further comprising a controller configured to energize the actuator to change a position of the valve members so as to cycle through each of the vats.

9. The valve assembly of claim 8, wherein the controller is configured to control the operations of the valve assembly such that the filter assembly will continuously filter oil from each vat for a set period of time in sequence.

10. The valve assembly of claim 1, wherein each of the first valve and the second valve is a five-ported valve.

11. A valve assembly configured to selectively connect a filter assembly with a plurality of vats, the valve assembly comprising:
a valve assembly housing;
a first valve disposed within the valve assembly housing configured to selectively connect a first line extending from a clean chamber of the filter assembly with one of a plurality of clean lines, wherein each clean line extends out of the valve assembly housing from the first valve to one of the plurality of vats; and
a second valve disposed within the valve assembly housing configured to selectively connect a second line extending from a dirty chamber of the filter assembly with one of a plurality of dirty lines, wherein each dirty line extends out of the valve assembly housing from the second valve to one of the plurality of vats,
wherein the valve assembly is separate from the plurality of vats and is configured to allow the filter assembly to continuously filter oil from a selected one of the plurality of vats such that the selected one of the plurality of vats is usable during a filtering operation.

12. The valve assembly of claim 11, wherein each valve comprises a valve member and a valve housing.

13. The valve assembly of claim 12, wherein each valve member is a ball that defines an L-shaped passageway.

14. The valve assembly of claim 12, wherein each valve housing defines a first port, a second port, and a third port.

15. The valve assembly of claim 12 further comprising a linking member, wherein the linking member comprises a first gear, a second gear, and a chain rotatably linking the first and second gears together.

16. The valve assembly of claim 15, wherein each valve member is coupled to a stem such that rotation of the stem creates rotation of the respective valve member, and wherein the first gear is coupled to the stem of the valve member of the first valve and the second gear is coupled to the stem of the valve member of the second valve.

17. The valve assembly of claim 16 further comprising an actuator, wherein the actuator comprises a shaft, and wherein the shaft of the actuator is coupled to the first gear such that as the shaft of the actuator rotates, the linking member translates the rotation into a rotation of the valve members such that the valve member of the first valve and the valve member of the second valve are moved substantially simultaneously to select one of the plurality of vats from which to draw oil for filtering.

18. The valve assembly of claim 17 further comprising a controller configured to energize the actuator to change the position of the valve members so as to cycle through each of the vats.

19. The valve assembly of claim 18, wherein the controller is configured to control the operations of the valve assembly such that the filter assembly will continuously filter oil from each vat for a set period of time in sequence.

20. The valve assembly of claim 11, wherein each of the first valve and the second valve is a five-ported valve.

* * * * *